United States Patent
Takamizawa

(10) Patent No.: US 10,135,324 B2
(45) Date of Patent: Nov. 20, 2018

(54) ARMATURE FOR LINEAR MOTOR AND LINEAR MOTOR

(71) Applicant: FANUC CORPORATION, Yamanashi (JP)

(72) Inventor: Suguru Takamizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/839,529

(22) Filed: Dec. 12, 2017

(65) Prior Publication Data

US 2018/0175718 A1 Jun. 21, 2018

(30) Foreign Application Priority Data

Dec. 16, 2016 (JP) ................. 2016-244658

(51) Int. Cl.
| | |
|---|---|
| H02K 41/03 | (2006.01) |
| H02K 1/18 | (2006.01) |
| H02K 3/34 | (2006.01) |
| H02K 3/52 | (2006.01) |
| H02K 9/193 | (2006.01) |
| H02K 1/17 | (2006.01) |
| H02K 1/26 | (2006.01) |
| H02K 1/34 | (2006.01) |
| H02K 9/19 | (2006.01) |

(52) U.S. Cl.
CPC ............ *H02K 41/033* (2013.01); *H02K 1/17* (2013.01); *H02K 1/18* (2013.01); *H02K 1/26* (2013.01); *H02K 1/34* (2013.01); *H02K 3/345* (2013.01); *H02K 3/52* (2013.01); *H02K 9/19* (2013.01); *H02K 9/193* (2013.01)

(58) Field of Classification Search
CPC ............ H02K 41/03; H02K 1/18; H02K 3/34; H02K 3/52; H02K 9/193; H02K 3/345; H02K 9/19; H02K 1/17; H02K 1/26; H02K 41/033
USPC ....................................... 310/12.01
See application file for complete search history.

(56) References Cited

U.S. PATENT DOCUMENTS

| | | | |
|---|---|---|---|
| 7,633,188 B2 | 12/2009 | Kitade et al. | |
| 2005/0285451 A1* | 12/2005 | Kubo ................. | G03F 7/70758 310/12.15 |

(Continued)

FOREIGN PATENT DOCUMENTS

| | | |
|---|---|---|
| JP | H05-111234 A | 4/1993 |
| JP | H07-250466 A | 9/1995 |

(Continued)

*Primary Examiner* — Naishadh N Desai
(74) *Attorney, Agent, or Firm* — Studebaker & Brackett PC

(57) ABSTRACT

An armature for linear motor having excellent precision in attachment to a machine and capable of reducing the likelihood of trouble in a resin layer, entry of a foreign material, and the like is provided. An armature comprises: a block attachment part provided to a machine attachment side of a core; a protection sheet having ability to be impregnated with resin and covering a surface of the core and a surface of the block attachment part; a block attached to the block attachment part and having a machine attachment surface arranged at the block attachment side of the core; and a resin layer covering the protection sheet covering the core. The machine attachment surface of the block is exposed from the resin layer.

6 Claims, 10 Drawing Sheets

(56) References Cited

U.S. PATENT DOCUMENTS

| | | | |
|---|---|---|---|
| 2007/0257564 A1* | 11/2007 | Kitade | H02K 41/03 310/12.23 |
| 2009/0230785 A1* | 9/2009 | Ida | H02K 41/03 310/12.31 |
| 2013/0049490 A1* | 2/2013 | Shimura | H02K 41/031 310/12.24 |

FOREIGN PATENT DOCUMENTS

| | | |
|---|---|---|
| JP | H09-070166 A | 3/1997 |
| JP | 2000-217334 A | 8/2000 |
| JP | 3698585 B2 | 9/2005 |
| JP | 2010-115042 A | 5/2010 |
| JP | 2011-101551 A | 5/2011 |
| JP | 4886355 B2 | 2/2012 |
| JP | 2012-055089 A | 3/2012 |
| JP | 5199427 B2 | 5/2013 |

* cited by examiner

ARMATURE FOR LINEAR MOTOR AND LINEAR MOTOR

This application is based on and claims the benefit of priority from Japanese Patent Application No. 2016-244658, filed on 16 Dec. 2016, the content of which is incorporated herein by reference.

BACKGROUND OF THE INVENTION

Field of the Invention

The present invention relates to an armature for linear motor and a linear motor.

Related Art

Use of linear motors has been suggested in recent years as driving devices for various industrial machines such as mechanisms for driving magnetic heads of OA machines and mechanisms for feeding spindles/tables of machine tools. For simplification of the configurations of linear motors of these types, there has been an increasing tendency toward use of multiple permanent magnets as a field pole.

In some of the linear motors for the above-described purposes, to reduce the likelihood of entry of a foreign material into an armature, etc., a resin layer is formed on a surface of a core as a main body of the armature. When the resin layer is on the surface of the core, troubles in high-temperature or low-temperature environment such as warpage, undulation, breakage, or reduction in dimensional accuracy may occur resulting from a difference in coefficient of linear expansion between the core and resin. To overcome these troubles, an attempt has been made by covering the surface of the core with woven cloth and forming the resin layer through the woven cloth (see Japanese Patent No. 5199427, Japanese Patent No. 3698585, and Japanese Patent No. 4886355, for example).

Patent Document 1: Japanese Patent No. 5199427
Patent Document 2: Japanese Patent No. 3698585
Patent Document 3: Japanese Patent No. 4886355

SUMMARY OF THE INVENTION

To attach the armature to a machine precisely, a machine attachment surface of the core is required to be subject to planarization grinding. This prohibits covering of the machine attachment surface of the core with the woven cloth. However, when the machine attachment surface is not covered with the woven cloth, it is difficult to reduce the likelihood of entry of a foreign material into the armature through the machine attachment surface, etc., which may deteriorate the quality and the reliability of the armature.

Hence, it is desired to make an armature for linear motor and a linear motor having excellent precision in attachment to a machine and capable of reducing the likelihood of trouble in a resin layer and entry of a foreign material into the armature.

It is an object of the present invention to provide an armature for linear motor and a linear motor having excellent precision in attachment to a machine and capable of reducing the likelihood of trouble in a resin layer, entry of a foreign material, etc.

(1) The present invention relates to an armature (armature 20 described later, for example) for linear motor with a core (core 21 described. later, for example) serving as a main body and a coil (coil 22 described later, for example) attached to the core. The armature works cooperatively with a field pole to form a linear motor. The field pole includes magnets of different poles arranged alternately in a driving direction. The armature includes: a block attachment part (block attachment part 23 described later, for example) provided at a machine attachment side of the core on; a protection sheet (woven cloth 25 described later, for example) having ability to be impregnated with resin and covering a surface of the core and a surface of the block attachment part; a block (block 24 described later, for example) attached to the block attachment part and having a machine attachment surface (machine attachment surface 24a described later, for example) arranged at the block attachment side of the core; and a resin layer (resin layer 26 described later, for example) covering the protection sheet covering the core. The machine attachment surface of the block is exposed from the resin layer.

(2) in the armature for linear motor described in (1), the block attachment part may have space recessed inwardly from the surface at the machine attachment side of the core, and the block may be inserted at least partially into the space.

(3) In the armature for linear motor described in (2), the block may be at least partially formed into a shape that allows insertion into the space of the block attachment part from the surface at the machine attachment side of the core.

(4) in the armature for linear motor described in (2), the block is preferably at least partially formed into a shape that allows insertion into the space of the block attachment part from a side surface of the core.

(5) In the armature for linear motor described in any one of (1) to (4), the machine attachment surface of the block attached to the block attachment part preferably protrudes from a surface of the resin layer.

(6) The present invention relates to a linear motor (linear motor 1 described later, for example) comprising: a field pole (field pole 10 described later, for example) including magnets of different poles arranged alternately in a driving direction; and the armature (armature 20 described later, for example) for linear motor described in any one of (1) to (5).

According to the present invention, an armature for linear motor and a linear motor have excellent precision in attachment to a machine and are capable of reducing the likelihood of trouble in a resin layer, entry of a foreign material, etc.

DETAILED DESCRIPTION OF THE INVENTION

Figure 1:
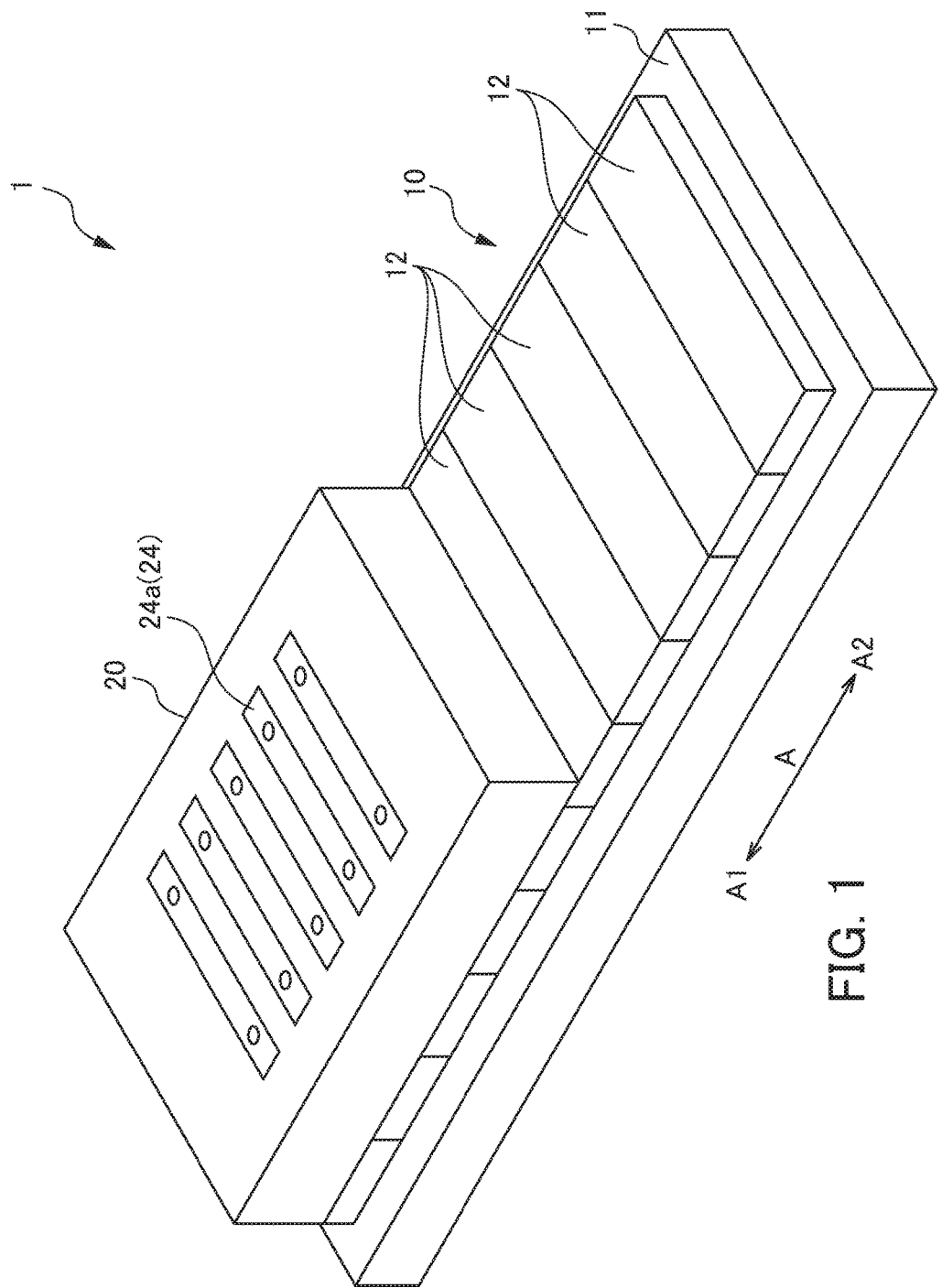
FIG. 1 explains a linear motor 1 according to a first embodiment.

Embodiments of the present invention will be described below. All the drawings accompanying this specification are schematic views. In consideration of ease of understanding, etc., each part illustrated in the drawings is changed or exaggerated compared to a real thing in terms of a shape, a scale, a ratio between a vertical dimension and a horizontal dimension, etc. In the drawings, hatching indicating the cross section of a member is omitted, where appropriate.

In this specification, etc., terms used for specifying shapes, geometric conditions, and the extensions of these shapes and levels of these conditions such as "being parallel" and "direction" cover not only the exact meanings of these terms but also a range recognizable as being substantially parallel and a range recognizable as a direction indicated by a corresponding term.

In this specification, etc., a depth direction of a core 21 described later and a longitudinal direction of a block 24 described later are defined as X (X1-X2) direction, a width direction of the core 21 and a direction in which blocks 24 are arranged are defined as a Y (Y1-Y2) direction, and a thickness direction of the core 21 and a height direction of the block 24 are defined as a Z (Z1-Z2) direction.

(First Embodiment)

FIG. 1 explains a linear motor 1 according to a first embodiment. The linear motor 1 shown in FIG. 1 has a basic configuration common to a second embodiment and a third embodiment described later.

Figure 2:
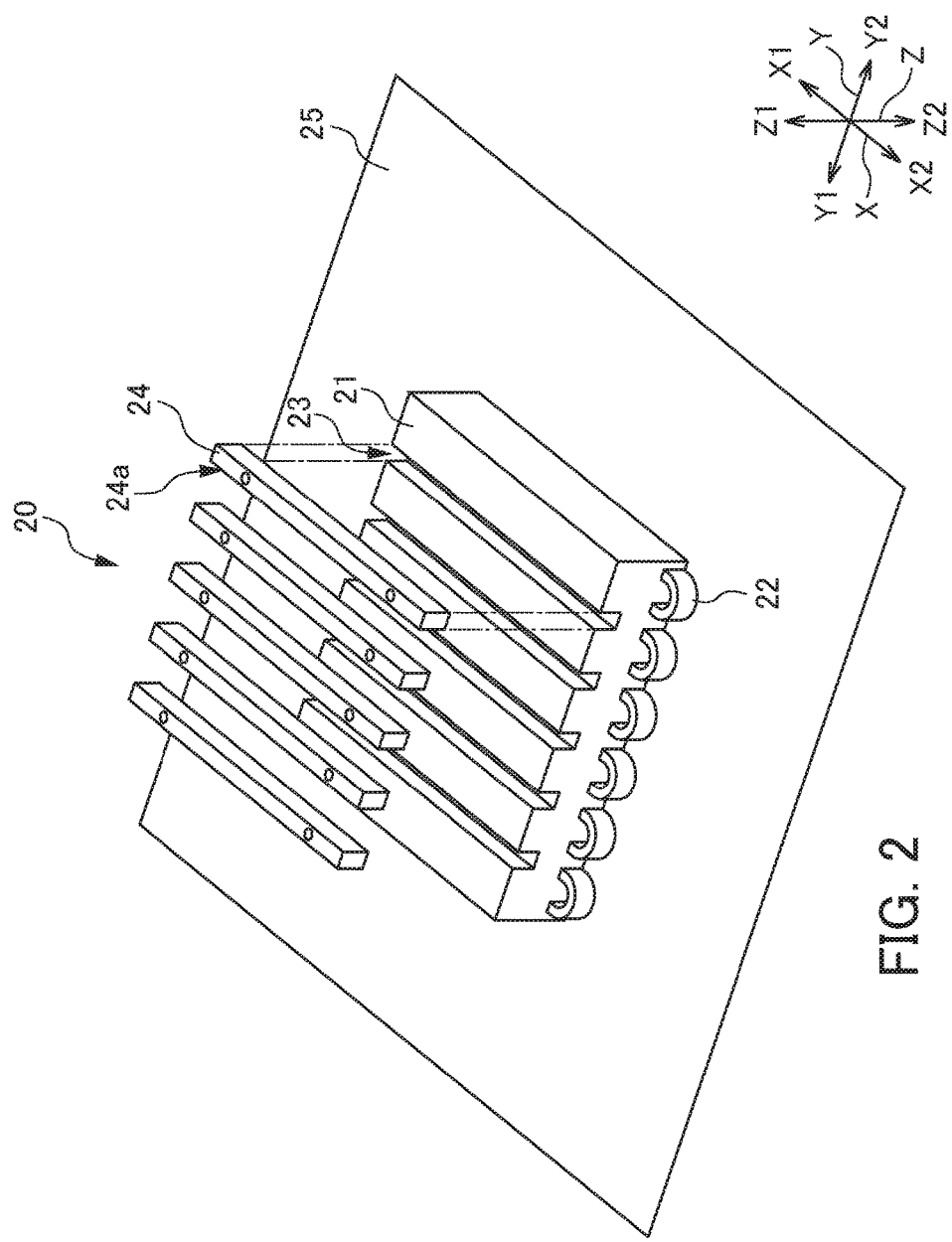
FIG. 2 explains the configuration of an armature 20.

FIG. 2 is an exploded perspective view of an armature 20.

Figure 3A:
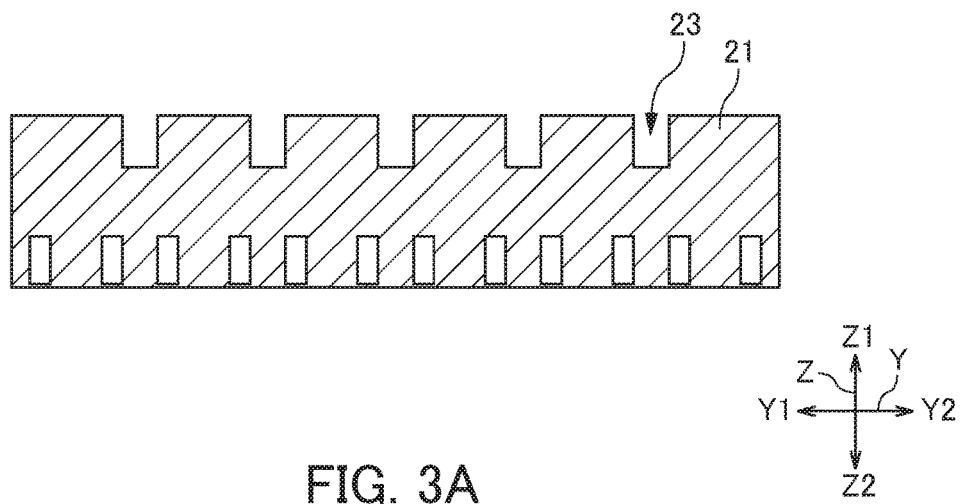
FIG. 3A is a sectional view of a core 21 in a Y-Z plane.
Figure 3B:
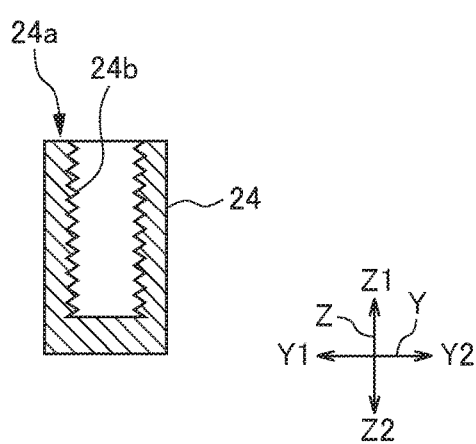
FIG. 3B is a sectional view of a block 24 in the Y-Z plane.

FIG. 3A is a sectional view of the core 21 in a Y-Z plane. FIG. 3B is a sectional view of the block 24 in the Y-Z plane. FIG. 3B shows the cross section of the block 24 in an area where a screw part 24b is formed.

As shown in FIG. 1, the linear motor 1 includes a field pole 10 and the armature 20. The armature 20 has a form with a resin layer 26 described later (see FIG. 4C). The field pole 10 is a stator with magnets of different poles arranged alternately in a direction in which the armature 20 is driven (in FIG. 1, an A direction).

The field pole 10 includes a support surface 11, and multiple permanent magnets 12 arranged substantially parallel to each other or in a slightly skewed pattern on the support surface 11. The field pole 10 includes N-pole permanent magnets 12 and S-pole permanent magnets 12 arranged alternately in the direction in which the armature 20 is driven. The permanent magnets 12 are bonded to the support surface 11 with an adhesive agent, for example.

The armature 20 works cooperatively with the field pole 10 to form a linear motor. The armature 20 is attached to a machine (not shown in the drawings) through a machine attachment surface 24a of the block 24 (described later).

As shown in FIG. 2, the armature 20 includes the core 21, a coil 22, a block attachment part 23, the block 24, woven cloth 25 functioning as a protection sheet, and the resin layer 26. FIG. 2 is an exploded (developed) perspective view of the armature 20. Thus, the resin layer 26 is omitted from FIG. 2. The resin layer 26 will be described later. A member such as a wire for supplying power to the coil 22 is omitted from FIG. 2.

The core 21 functions as a main body of the armature 20. The core 21 is formed as a stack with multiple plate members made from a magnetic material placed one above the other in the X direction.

The coil 22 is an armature winding to generate a magnetic field. The coil 22 is housed in multiple slots (not shown in the drawings) formed inside the core 21. In response to application of a single-phase alternating current or a three-phase alternating current to each coil 22, a shifting magnetic field is generated at the coil 22. Then, attractive force and repelling force are exerted between the shifting magnetic field generated by the coil 22 and the magnetic field generated by the field pole 10, whereby thrust is applied to the armature 20 by the component in the driving direction (Y direction) in which the armature 20 is driven. As shown in FIG. 1, in response to receipt of this thrust, the armature 20 moves linearly in the A (A1-A2) direction in which the permanent magnets 12 of the field pole 10 are arranged.

The block attachment part 23 is space recessed inwardly from a surface of the core 21 at the machine attachment side (Z1 side). The block attachment part 23 is a part into which the block 24 is to be inserted at least partially. As shown in FIG. 3A, the block attachment part 23 according to this embodiment is a groove having a rectangular cross section in the Y-Z plane. As shown in FIG. 2, the block attachment part 23 extends in the X (X1-X2) direction of the core 21. The groove width (Y direction) of the block attachment part 23 preferably has such a dimension so as to achieve fixing force of such a degree that the block 24 is not pulled out easily in the thickness direction of the core 21 (Z1 direction) when the block 24 is inserted into the block attachment part 23 while the block attachment part 23 is covered with the woven cloth 25.

If the force of the block attachment part 23 for fixing the block 24 is weak, the machine attached to the block 24 is placed in an unstable posture. Meanwhile, reducing the groove width of the block attachment part 23 excessively for the purpose of increasing the force for fixing the block 24 causes trouble such as displacement or tear of the woven cloth 25 during insertion of the block 24 into the block attachment part 23. In addition, the machine attachment surfaces 24a of the blocks 24 inserted in the corresponding block attachment parts 23 are likely to be uneven in terms of the height in the Z direction, and this unevenness increases the time it takes to perform planarization grinding of the blocks 24. Additionally, if the block 24 is tilted from the block attachment part 23 while being inserted into the block attachment part 23, assembling and fixing the armature 20 and the machine might be difficult.

In the present embodiment, five block attachment parts 23 are provided in one core 21, but the number of the block attachment parts 23 can be changed to conform to product specification, for example.

The block 24 is a metallic component to be attached to the block attachment part 23. As shown in FIG. 3B, the cross section of the block 24 in the Y-Z plane is formed into a rectangular shape similar (including a shape recognizable as being similar) to that of the shape of the groove of the block attachment part 23 shown in FIG. 2.

As shown in FIG. 3B, the block 24 includes the machine attachment surface 24a and the screw part 24b.

The machine attachment surface 24a is a surface at the upper side (Z1 side) when the block 24 is inserted into the block attachment part 23. The machine attachment surface 24a is not always at the upper side. The machine (not shown in the drawings) to be driven by the linear motor 1 is attached to the machine attachment surface 24a. After the block 24 is inserted into the block attachment part 23 and the resin layer 26 is formed, the machine attachment surface 24a is subject to planarization grinding.

The screw part 24b is a part into which a bolt (not shown in the drawings) belonging to the machine is to be inserted. As shown in FIG. 3B, the screw part 24b is provided with a female screw. The machine can be attached to the machine attachment surface 24a of the block 24 by inserting the bolt belonging to the machine into the screw part 24b and fastening the bolt and the screw part 24b together. As shown in FIG. 2, the screw parts 24b are provided at two positions along the longitudinal direction of the block 24 (X direction). Meanwhile, the screw part 24b may be provided at at least one position. The number of the screw parts 24b, the diameter of the screw hole of the screw part 24b, etc. can be changed to conform to product specification.

The woven cloth 25 is a sheet-like member covering a surface of the core 21 and that of the block attachment part 23. The woven cloth 25 is made from a material having ability to be impregnated with resin such as glass woven cloth or carbon fiber woven cloth, for example. As long as the woven cloth is made from a material having ability to be impregnated with resin, a material for the woven cloth may be a porous sheet-like material, for example, in addition to the exemplary materials described previously. The woven cloth 25 is placed over the surface of the core 21. The woven cloth 25 is also inserted into the inside of the groove of the block attachment part 23. Then, the folded woven cloth 25 is fixed at edges, tucked portions, etc., with adhesive tape or an adhesive agent, for example. By doing so, the surface of the core 21 can be entirely covered with the woven cloth 25.

The woven cloth 25 desirably has a size for covering the surface of the core 21 entirely. However, the woven cloth 25 is not always required to cover the entire surface of the core 21. The woven cloth 25 is expected to cover at least a part of the core 21 where thermal stress generated in the core 21 is likely to be transmitted to the resin layer 26 described later when the resin layer 26 is formed on the surface of the core 21, and to achieve a function for preventing liquid splashed onto the armature 20 from entering into the inside of the armature 20.

The resin layer 26 is a resin molding for covering the core 21 and the block attachment part 23 covered with the woven cloth 25. The resin layer 26 is formed by using epoxy resin, phenol resin, or acrylic resin, for example. The resin layer 26 can be formed by being molded on the core 21 and the block attachment part 23 covered with the woven cloth 25, for example.

A procedure of manufacturing the armature 20 according to the first embodiment will be described next.

Figure 4A:
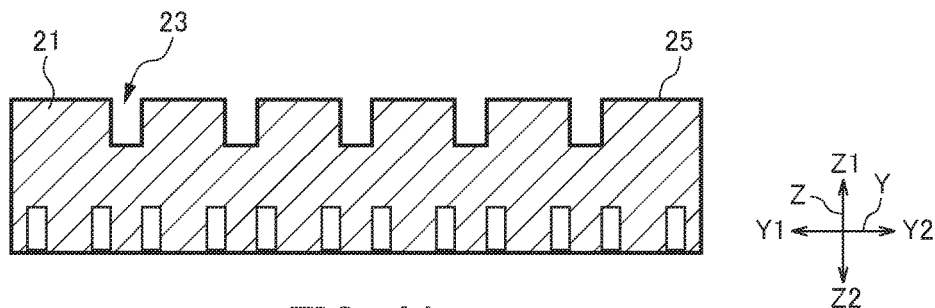
FIG. 4A explains a procedure of manufacturing the armature 20 according to the first embodiment.
Figure 4B:
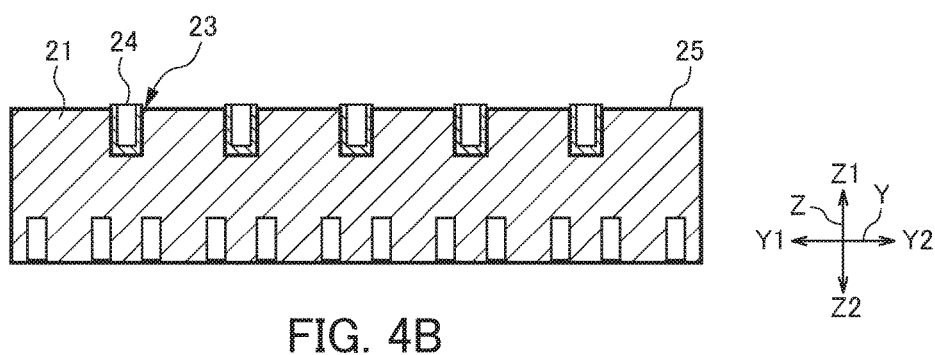
FIG. 4B explains the procedure of manufacturing the armature 20 according to the first embodiment.
Figure 4C:
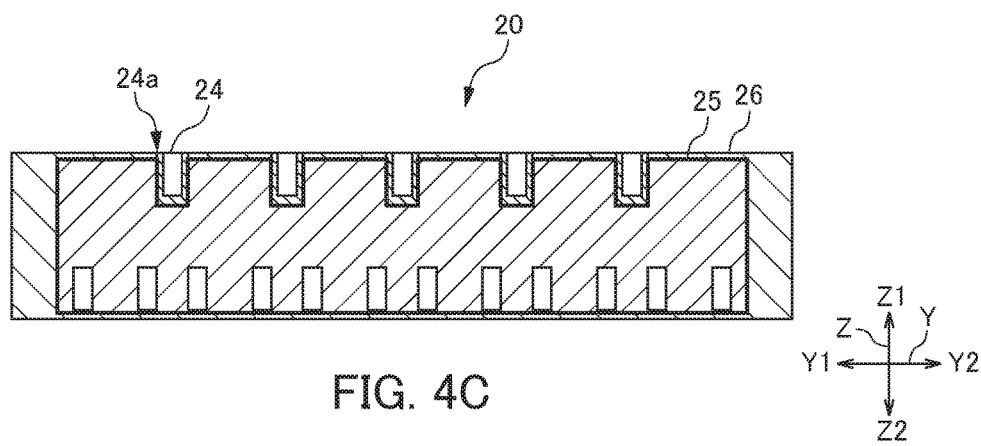
FIG. 4C explains the procedure of manufacturing the armature 20 according to the first embodiment.

FIGS. 4A to 4C explain the procedure of manufacturing the armature 20 of the first embodiment. Like FIG. 3A, FIGS. 4A to 4C are sectional views of the core 21 in the Y-Z plane.

First, as shown in FIG. 4A, the surface of the core 21 and that of the block attachment part 23 are covered with the woven cloth 25.

Next, as shown in FIG. 4B, the block 24 is inserted into the block attachment part 23 covered with the woven cloth 25 from the thickness direction of the core 21 (Z direction) to attach the block 24 to the block attachment part 23. By inserting the block 24 into the block attachment part 23, the inner surface of the groove of the block attachment part 23 is covered more tightly with the woven cloth 25.

Next, as shown in FIG. 4C, the core 21 and the block attachment part 23 covered with the woven cloth 25 are molded with a resin material to form the resin layer 26. The resin layer 26 is formed only on a part covered with the woven cloth 25, so that the machine attachment surface 24a of the block 24 is exposed from the resin layer 26.

Next, the machine attachment surface 24a of the block 24 inserted in the armature 20 (block attachment part 23) is subject to planarization grinding, thereby completing formation of the armature 20 with the exposed machine attachment surface 24a planarized by grinding.

In the above-described armature 20 according to the first embodiment, the machine attachment surface 24a is not covered with the woven cloth 25. Thus, the machine attachment surface 24a can be subject to planarization grinding. As a result, the armature 20 according to the first embodiment can be attached precisely to the machine.

In the armature 20 according to the first embodiment, the resin layer 26 is formed so as to cover the core 21 and the block attachment part 23 covered with the woven cloth 25. In this way, the core 21 and the resin layer 26 are integrated with each other with the presence of the woven cloth 25 between the core 21 and the resin layer 26. This achieves a substantially uniform coefficient of linear expansion in the armature 20. Thus, the armature 20 according to the first embodiment is capable of reducing the likelihood of trouble in high-temperature or low-temperature environment such as warpage, undulation, breakage, or reduction in dimensional accuracy resulting from a difference in coefficient of linear expansion.

In the armature 20 according to the first embodiment, substantially entire surface of the core 21 and the block attachment part 23 are covered with the woven cloth 25. This makes it possible to reduce the likelihood of entry of liquid such as a cutting fluid (foreign material).

As a result, the armature 20 according to the first embodiment achieves excellent precision in attachment to a machine and is capable or reducing the likelihood of trouble in the resin layer 26, entry of a foreign material, etc.

In the armature 20 of the first embodiment, the cross section of the block 24 in the Y-Z plane is formed into a rectangular shape similar to the shape of the groove of the block attachment part 23. Thus, in the armature 20 of the first embodiment, the block 24 can easily be inserted into the block attachment part 23 covered with the woven cloth 25 from the thickness direction of the core 21 (Z direction). Like in the second embodiment described later, the block 24 can be inserted from the depth direction of the core 21 (X direction).

(Second Embodiment)

Figure 5:
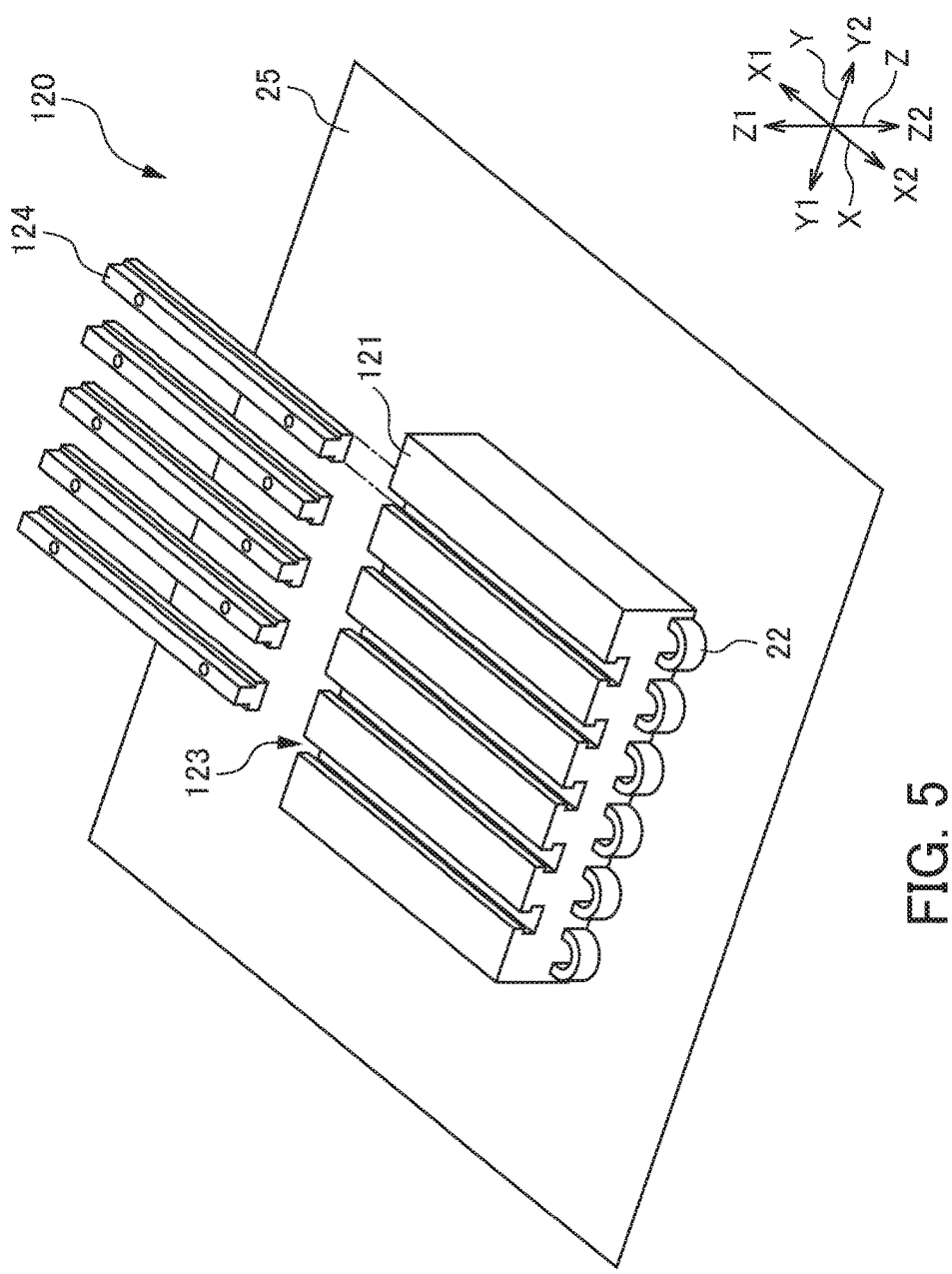
FIG. 5 is an exploded perspective view of an armature 120 according to a second embodiment.

FIG. 5 is an exploded perspective view of an armature 120 of the second embodiment.

Figure 6A:
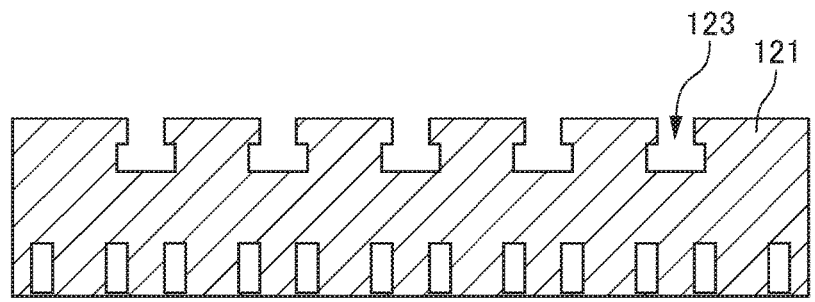
FIG. 6A is a sectional view of a core 121 in the Y-Z plane.
Figure 6B:
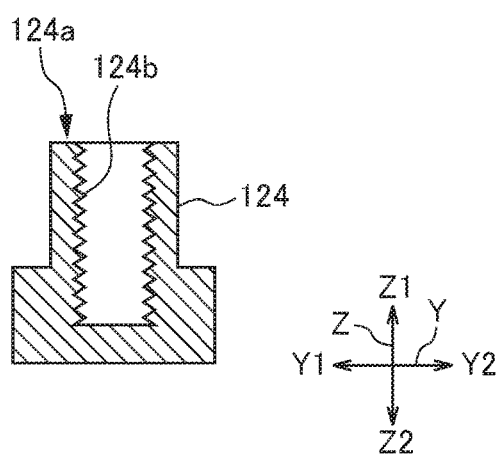
FIG. 6B is a sectional view of a block 124 in the Y-Z plane.

FIG. 6A is a sectional views of a core 121 in the Y-Z plane. FIG. 6B is a sectional view of a block 124 in the Y-Z plane. FIG. 6B shows the cross section of the block 124 in an area where a screw part 124b is formed.

In the description of the second embodiment and drawings relating to the second embodiment, constituent elements achieving the same functions as those of the first embodiment are denoted with the same reference numerals or reference numerals having the same suffix (last two digits). Where appropriate, redundant explanation about such constituent elements will be omitted.

As shown in FIG. 5, the armature 120 according to the second embodiment includes the core 121, the coil 22, a block attachment part 123, the block 124, the woven cloth 25, and the resin layer 26. FIG. 5 is an exploded (developed) perspective view of the armature 120. Thus, the resin layer 26 is omitted from FIG. 5.

The armature 120 according to the second embodiment differs from that of the first embodiment in terms of the shape of the block attachment part 123, that of the block 124, etc. provided at the core 121.

As shown in FIG. 6A, the block attachment part 123 according to the second embodiment is a groove having a cross section of an inverted T-shape in the Y-Z plane. A portion of the block attachment part 123 corresponding to the vertical bar of "T" is opened toward the Z1 side. As shown in FIG. 5, the block attachment part 123 extends in the X (X1-X2) direction of the core 121. The groove of the block attachment part 123 preferably has a shape that achieves fixing force of such a degree that the block 124 is not pulled out easily in the depth direction of the core 121 (X direction) when the block 124 is inserted into the block attachment part 123 while the block attachment part 123 is covered with the woven cloth 25.

As shown in FIG. 6B, the cross section of the block 124 according to the second embodiment in the Y-Z plane is formed into an inverted T shape similar to the shape of the groove of the block attachment part 123 shown in FIG. 6A. A portion of the block 124 corresponding to the vertical bar of "T" protrudes toward the Z1 side. As shown in FIG. 6B, the block 124 includes a machine attachment surface 124a and the screw part 124b. The height dimension of the block 124 (in the Z direction) according to this embodiment is set in such a manner that the machine attachment surface 124a protrudes from the resin layer 26 while the block 124 is inserted in the block attachment part 123.

A procedure of manufacturing the armature 120 according to the second embodiment will be described next.

Figure 7A:
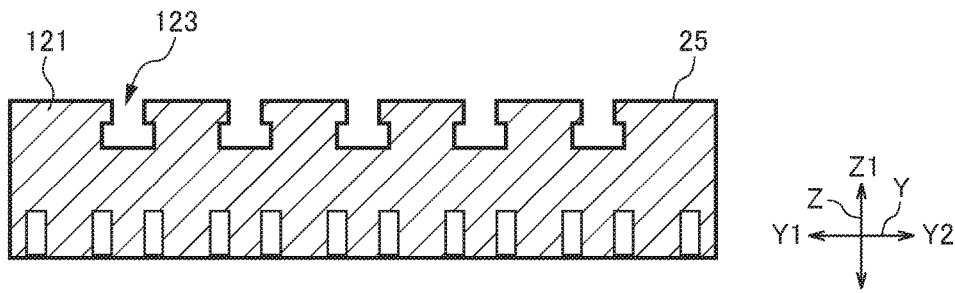
FIG. 7A explains a procedure of manufacturing the armature 120 according to the second embodiment.
Figure 7B:
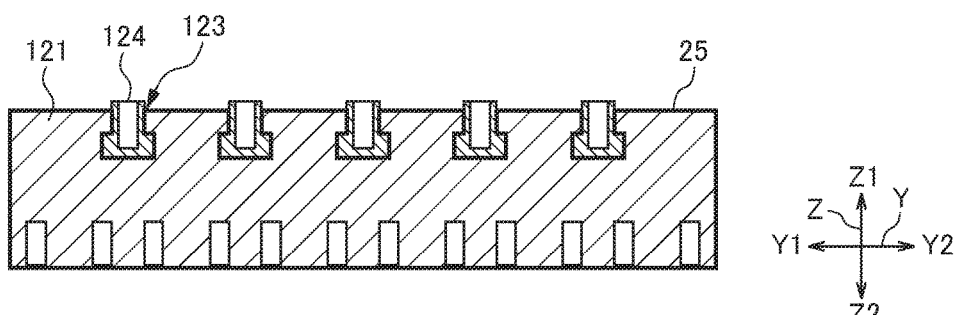
FIG. 7B explains the procedure of manufacturing the armature 120 according to the second embodiment.
Figure 7C:
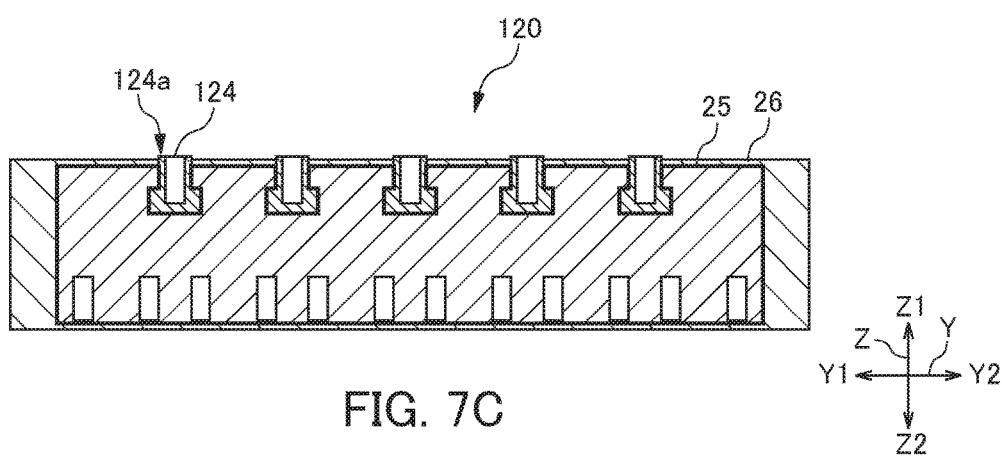
FIG. 7C explains the procedure of manufacturing the armature 120 according to the second embodiment.

FIGS. 7A to 7C explain the procedure of manufacturing the armature 120 according to the second embodiment.

First, as shown in FIG. 7A, a surface of the core 121 and that of the block attachment part 123 are covered with the woven cloth 25.

Next, as shown in FIG. 7B, the block 124 is inserted into the block attachment part 123 covered with the woven cloth 25 to attach the block 124 to the block attachment part 123. As shown in FIG. 5A, the block 124 according to this embodiment is inserted from the depth direction of the core 121 (X direction). By inserting the block 124 into the block attachment part 123, the inner surface of the groove of the block attachment part 123 is covered more tightly with the woven cloth 25.

Next, as shown in FIG. 7C, the core 121 and the block attachment part 123 covered with the woven cloth 25 are molded with a resin material to form the resin layer 26. The resin layer 26 is formed only on a part covered with the woven cloth 25, so that the machine attachment surface 124a of the block 124 is exposed from the resin layer 26.

Next, the machine attachment surface 124a of the block 124 inserted in the armature 120 (block attachment part 123) is subject to planarization grinding, thereby completing formation of the armature 120 with the exposed machine attachment surface 124a planarized by grinding. As shown in FIG. 7C, in the armature 120 according to this embodiment, the machine attachment surface 124a protrudes from the resin layer 26 while the block 124 is inserted in the block attachment part 123.

Like that of the first embodiment, the armature 120 according to the second embodiment achieves excellent precision in attachment to a machine and is capable of reducing the likelihood of trouble in the resin layer 26, entry of a foreign material, etc.

The block attachment part 123 according to the second embodiment is a groove having the cross section in the Y-Z plane formed into the inverted T shape. The cross section of the block 124 in the Y-Z line is also formed into the inverted T shape similar to that of the groove of the block attachment part 123. In this configuration, inserting the block 124 into the block attachment part 123, makes a fit between the block 124 and the block attachment part 123. As a result, even if the block 124 is subject to stress exerted in the Z1 direction, for example, the block 124 is not pulled out from the block attachment part 123. In this way, the armature 120 according to the second embodiment can more greatly increase force of the block 124 for fixing a machine (not shown in the drawings) when the armature 120 is attached to the machine.

The height dimension of the block 124 (in the Z direction) according to the second embodiment is set in such a manner that the machine attachment surface 124a protrudes from the resin layer 26 while the block 124 is inserted in the block attachment part 123. This eliminates the risk of grinding the resin layer 26 during planarization grinding on the machine attachment surface 124a. Thus, the likelihood of entry of a foreign material such as liquid can be reduced more effectively.

(Third Embodiment)

Figure 8:
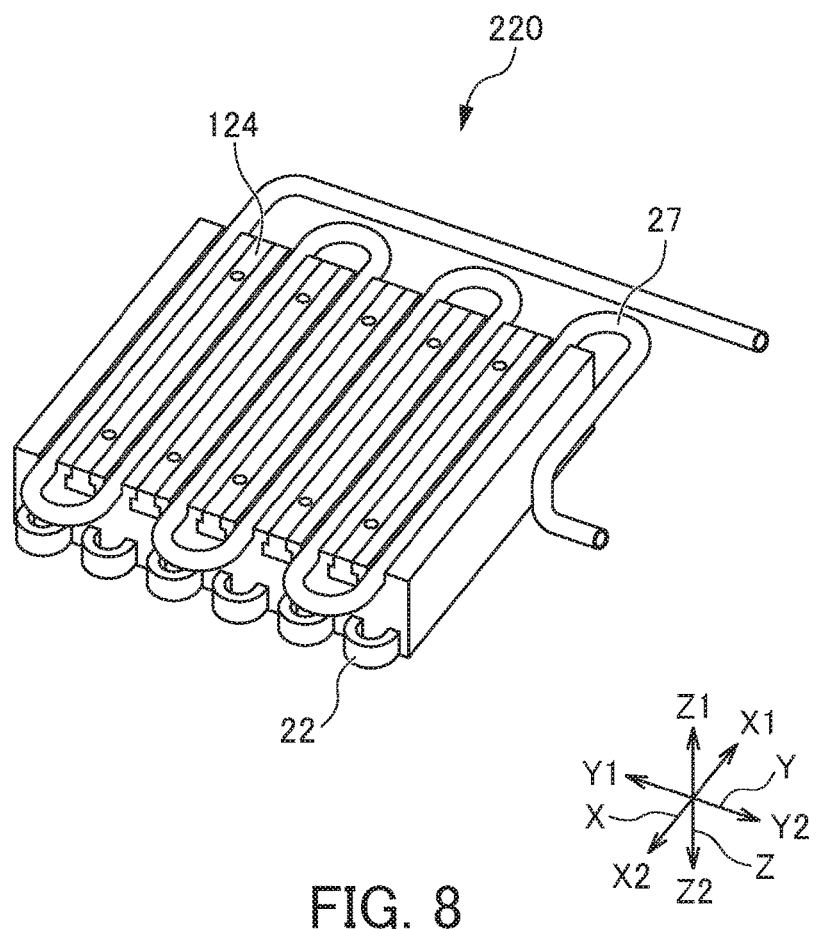
FIG. 8 explains an armature 220 according to a third embodiment.

FIG. 8 explains an armature 220 according to a third embodiment. Members such as the woven cloth 25 and the resin layer 26 are omitted from FIG. 8.

Figure 9A:
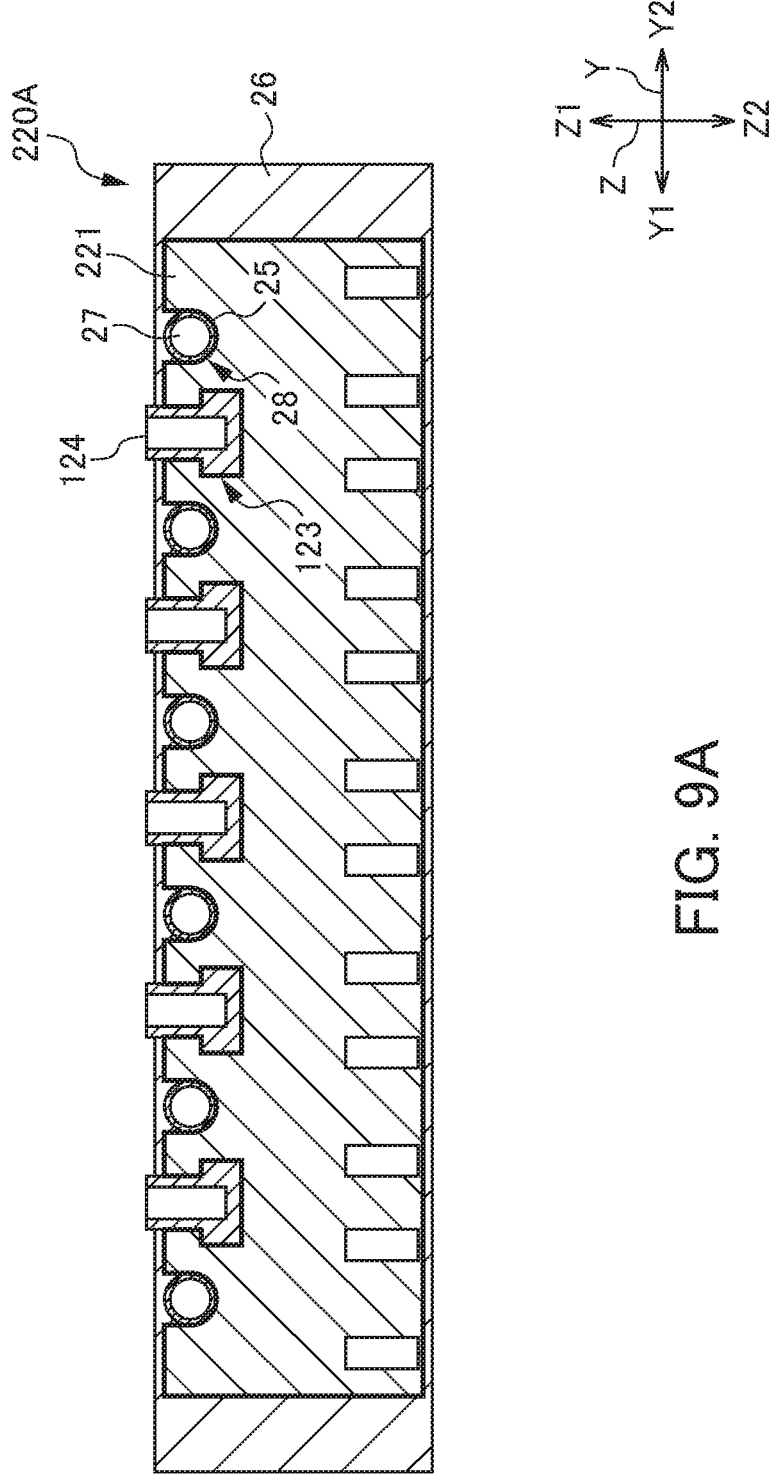
FIG. 9A is a sectional view showing a form of the armature 220 according to the third embodiment.
Figure 9B:
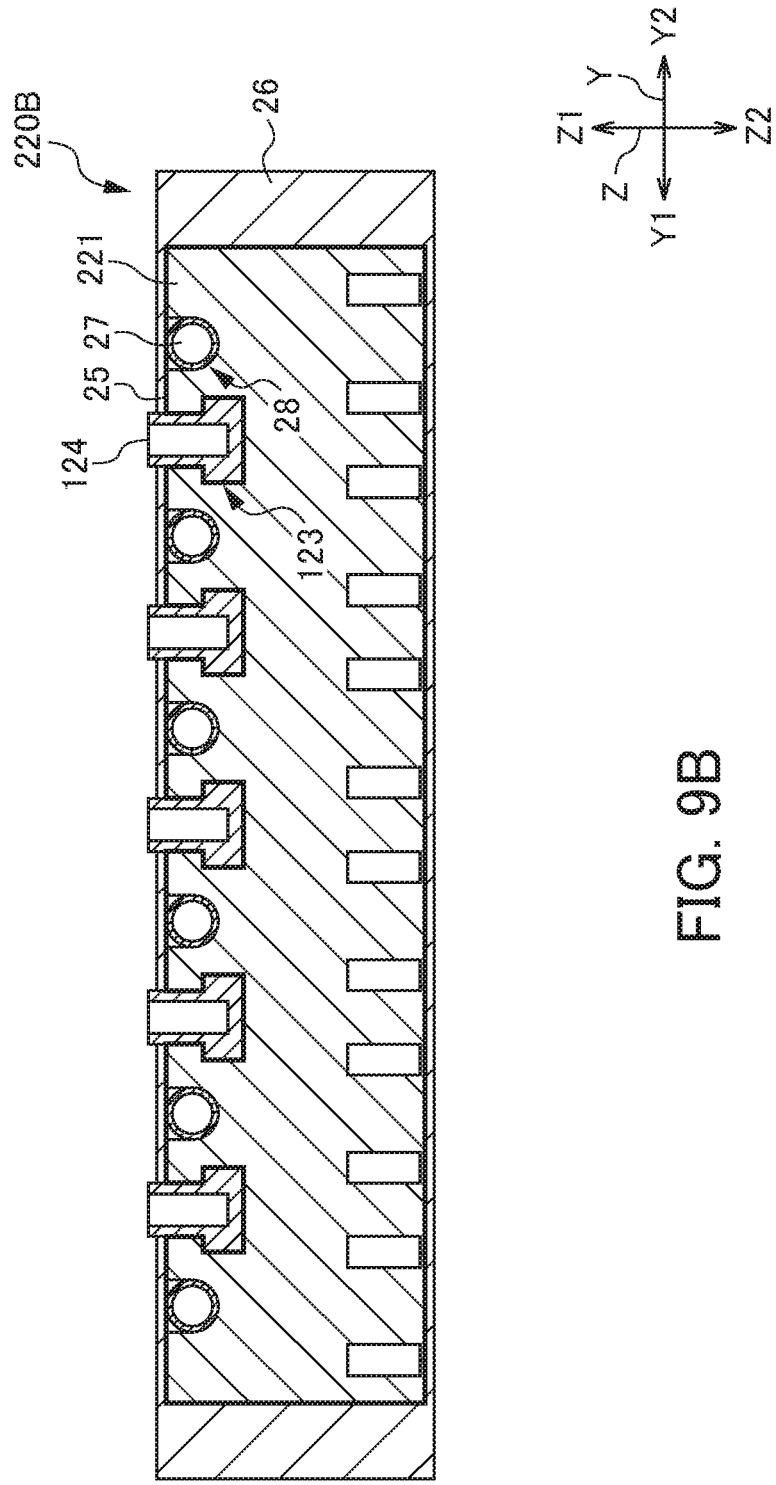
FIG. 9B is a sectional view showing a different form of the armature 220 according to the third embodiment.

FIG. 9A is a sectional view showing a form of the armature 220 according to the third embodiment. FIG. 9B is a sectional view showing a different form of the armature 220 of the third embodiment.

In the description of the third embodiment and drawings relating to the third embodiment, constituent elements achieving the same functions as those of the first and second embodiments are denoted with the same reference numerals or reference numerals having the same suffix (last two digits). Where appropriate, redundant explanation about such constituent elements will be omitted.

As shown in FIG. 8, the armature 220 according to the third embodiment includes a cooling pipe 27 for cooling the coil 22. The cooling pipe 27 is placed in a siting groove 28 (described later) provided to a core 221. In the other respects, the basic configuration of the armature 220 according to the third embodiment is the same as that of the armature 120 according to the second embodiment. Thus, members such as the block 124 will not be described.

In the present embodiment, the siting groove 28 is provided on a machine attachment surface side (Z1 side). Alternatively, the cooling pipe 27 may be provided inside of the core 221 partially or entirely, for example. In the present embodiment, the cooling pipe 27 and the block 124 are arranged alternately. Alternatively, the cooling pipe 27 may be arranged for every two blocks 124, for example. As described above, the shape, place of installation, etc. of the siting groove 28 are not limited to the examples shown in FIG. 8.

The following describes covering of the core 221 with the woven cloth 25 in the armature 220 including the cooling pipe 27.

In an armature 220A shown in FIG. 9A, the woven cloth 25 is inserted into the inner side of the siting groove 28. The cooling pipe 27 is arranged in the siting groove 28 while the woven cloth 25 is placed between the cooling pipe 27 and the siting groove 28. By arranging the cooling pipe 27 in the siting groove 28, the inner surface of the groove of the siting groove 28 is covered more tightly with the woven cloth 25.

In this form, the cooling pipe 27 arranged in the siting groove 28 is directly covered with the resin layer 26. In this form, the woven cloth 25 is caught between the cooling pipe 27 and the siting groove 28 (core 221). Thus, the woven cloth 25 is preferably made from a highly-flexible member having high heat conductivity. An example of such a member includes, but is not limited to, carbon fiber.

In an armature 220B shown in FIG. 9B, the cooling pipe 27 is arranged directly in the siting groove 28. The woven cloth 25 covers the cooling pipe 27 from above. In this form, the cooling pipe 27 arranged in the siting groove 28 is covered with the resin layer 26 while the woven cloth 25 is placed between the cooling pipe 27 and the resin layer 26.

In both the above-described forms shown in FIGS. 9A and 9B, when the core 221 and the block attachment part 123 are covered with the woven cloth 25, the siting groove 28 or a part corresponding to the siting groove 28 can be covered with the woven cloth 25 simultaneously.

In the third embodiment, the shape of the block and that of the block attachment part may be the same as those of the first embodiment.

The present invention is not limited to the above-described embodiments. Various modifications or changes such as modifications described later are applicable. These modifications or changes are also within the technical scope of the present invention. The effects described in these embodiments are merely a list of most preferred effects resulting from the present invention. Effects achieved by the present invention are not limited to those described in these embodiments. The above-described embodiments and the following modifications can be used in combination, where appropriate. However, such combinations will not be described in detail. The following description includes a structure common between the embodiments and such a structure will be given a name without a reference numeral.

(Modifications)

In the embodiments, a female screw is formed at the screw part of the block, but the embodiments are not limited thereto. A male screw may be formed at the screw part, or a crooked hook is also applicable, for example. Specifically, the machine attachment surface may have any structure as long as it can engage with an attachment surface of a machine. In the case of a compact armature, for example, the screw part may be replaced by an adhesive agent or adhesive tape, for example, for fixing between the machine and the machine attachment surface. In this case, the screw part is not required, so that the machine attachment surface can be a flat surface. The protection sheet is not limited to the woven cloth described in the embodiments.

In the embodiments, the field pole (see FIG. 1) has a linear shape. However, the embodiments are not limited thereto. The field pole may have an arc-like shape or a ring-like shape, for example.

In the embodiments, the groove of the block attachment part has a rectangular shape or an inverted T-shape in cross section in the Y-Z plane. However, the embodiments are not limited thereto. The cross section of the block attachment part in the Y-Z plane may have a different shape. Further, the shape of the cross section of the block in the Y-Z plane is not required to be similar to the shape of the groove of the block attachment part. For example, the cross section of the block attachment part may have an inverted T-shape in the Y-Z plane, and that of the block may have an L-shape in the Y-Z plane.

EXPLANATION OF REFERENCE NUMERALS

1: Linear motor, 10: Field pole, 20, 120, 220: Armature, 21, 221: Core, 22: Coil, 23, 123: Block attachment part, 24, 124: Block, 24a, 124a: Machine attachment surface, 25: Woven cloth (protection sheet), 26: Resin layer.

What is claimed is:

1. An armature for linear motor with a core serving as a main body and a coil attached to the core, the armature working cooperatively with a field pole to form a linear motor, the field pole including magnets of different poles arranged alternately in a driving direction, the armature comprising:
   a block attachment part provided at a machine attachment side of the core;
   a protection sheet having ability to be impregnated with resin and covering a surface of the core and a surface of the block attachment part;
   a block attached to the block attachment part and having a machine attachment surface arranged at the block attachment side of the core; and
   a resin layer covering the protection sheet covering the core, wherein
   the machine attachment surface of the block is exposed from the resin layer.

2. The armature for linear motor according to claim 1, wherein
   the block attachment part has space recessed inwardly from the surface at the machine attachment side of the core, and the block is inserted at least partially into the space.

3. The armature for linear motor according to claim 2, wherein
   the block is at least partially formed into a shape that allows insertion into the space of the block attachment part from the surface at the machine attachment side of the core.

4. The armature for linear motor according to claim 2, wherein
   the block is at least partially formed into a shape that allows insertion into the space of the block attachment part from a side surface of the core.

5. The armature for linear motor according to claim 1, wherein the machine attachment surface of the block attached to the block attachment part protrudes from a surface of the resin layer.

6. A linear motor comprising: a field pole including magnets of different poles arranged alternately in a driving direction; and
   the armature for linear motor according to claim 1.

* * * * *